United States Patent
Leidolt

(10) Patent No.: US 9,182,556 B2
(45) Date of Patent: Nov. 10, 2015

(54) LOCKABLE COUPLING FOR DETACHABLE CONNECTION OF FIBER-OPTICAL LIGHT GUIDES

(75) Inventor: Christoph Leidolt, Singen (DE)

(73) Assignee: Karl Storz GmbH & Co. KG (DE)

(*) Notice: Subject to any disclaimer, the term of this patent is extended or adjusted under 35 U.S.C. 154(b) by 19 days.

(21) Appl. No.: 13/479,429

(22) Filed: May 24, 2012

(65) Prior Publication Data

US 2012/0301088 A1 Nov. 29, 2012

(30) Foreign Application Priority Data

May 24, 2011 (DE) .......................... 10 2011 076 315

(51) Int. Cl.
*G02B 6/26* (2006.01)
*G02B 6/38* (2006.01)
*G02B 6/36* (2006.01)

(52) U.S. Cl.
CPC ............ *G02B 6/3893* (2013.01); *G02B 6/3624* (2013.01); *G02B 6/3809* (2013.01); *G02B 6/3882* (2013.01)

(58) Field of Classification Search
CPC ............... G02B 6/26; G02B 6/36; G02B 6/00
USPC ................................. 385/53–94, 88
See application file for complete search history.

(56) References Cited

U.S. PATENT DOCUMENTS

| | | | |
|---|---|---|---|
| 4,461,538 A * | 7/1984 | Breed et al. | 385/88 |
| 4,539,476 A | 9/1985 | Donuma et al. | |
| 4,747,656 A | 5/1988 | Miyahara et al. | |
| 2004/0071409 A1 * | 4/2004 | Brown | 385/78 |

FOREIGN PATENT DOCUMENTS

| | | |
|---|---|---|
| DE | 9314172 U1 | 12/1993 |
| DE | 19728254 A1 | 1/1999 |
| DE | 102009004458 B3 | 9/2010 |
| EP | 0599780 A1 | 6/1994 |
| WO | 2007095394 A2 | 8/2007 |
| WO | 2010081765 A1 | 7/2010 |

OTHER PUBLICATIONS

German Search Report; Application No. 10 2011 076 315.5; Issued: Feb. 17, 2012; 5 pages.
European Search Report; Application No. EP 12 00 3589; Issued: Jun. 22, 2012; Mailing Date: Jun. 29, 2012; 6 pages.

* cited by examiner

*Primary Examiner* — Kaveh Kianni
(74) *Attorney, Agent, or Firm* — Whitmyer IP Group LLC

(57) ABSTRACT

A coupling for the detachable connection of a fiber-optical light guide to a coupling counterpart including a coupling body that is connected to a fiber-optical light guide frame, including a gripping casing that circumferentially surrounds the coupling body at least in sections, and including at least one locking hook that is movably held in a radially resilient manner for the locking engagement behind at least one locking projection of the coupling counterpart, whereby the gripping casing is rotatably supported on the coupling body and the at least one locking hook can be lifted out of the locking engagement by a rotary movement of the gripping casing. A coupling device including a coupling and a coupling counterpart.

18 Claims, 6 Drawing Sheets

LOCKABLE COUPLING FOR DETACHABLE CONNECTION OF FIBER-OPTICAL LIGHT GUIDES

CROSS-REFERENCE TO RELATED APPLICATIONS

The present application claims priority of German patent application No. 10 2011 076315.5 filed on May 24, 2011, the content of which is incorporated herein by reference.

FIELD OF THE INVENTION

The present invention relates to a coupling for the detachable connection of a fiber-optical light guide with a coupling counterpart and to a coupling device with a coupling and a coupling counterpart.

BACKGROUND OF THE INVENTION

Couplings for the detachable connection of a fiber-optical light guide to a coupling counterpart are known. Thus, for example, couplings for connecting an optical fiber cable to a coupling counterpart constructed as the light connection of an endoscope are known. Here, illuminating light is generated in a light source separate from the endoscope and coupled into a fiber-optical light guide that can consist of a plurality of optical fibers. The fiber-optical light guide is part of an optical fiber cable that can be connected to the light source and to an endoscope and comprises a coupling for this. The optical fiber cable can be connected to the light connection of the endoscope in order to couple the illuminating light into another fiber-optical light guide arranged inside the endoscope in order to forward the illuminating light to an object field to be observed that is as a rule a hollow space inside the body. The fiber-optical light guide of the optical fiber cable as well as the one inside the endoscope customarily comprise to this end planar end surfaces that are brought in contact with one another or into an opposing position for transmitting the illuminating light, whereby an air gap can also remain between the end surfaces.

It is necessary when using the endoscope to establish a secure connection between the optical fiber cable and the endoscope. If the connection is detached in an unintended manner, not only is the endoscopic observation of the hollow space inside the body interrupted but also the very bright illuminating light can result in burns upon an uncontrolled movement of the free end of the optical fiber cable. Since both can result in disadvantageous or even dangerous situations in an endoscopic operation, it is important to avoid an unattended detachment of the connection. On the other hand, the connection of the optical fiber cable to the endoscope should always be able to be closed in a rapid and simple manner and detached again in order that a rapid and reliable establishing and detaching of the connection is possible in an operation situation without all too great attention being required from an operating person. It is therefore necessary, in particular in medical usages, to make possible a simple and reliable connecting and detaching of a fiber-optical light guide from a counterpart.

Therefore, couplings with a lock connection have been developed in which an unintended detaching of the connection of a fiber-optical light guide from a light connection should be avoided. An optical waveguide plug is known from DE 93 14 172 U1 in which a gripping casing is arranged in such a manner that it can be axially shifted relative to a plug body in which body a plug pin that surrounds an LWL fiber is guided in such a manner that it is secured against rotation but can axially shift. In order to increase the resistance of the plug to being pulled out, locking hooks are provided that engage into a circumferential groove of a coupling casing. A lifting device for lifting the locking hooks out and for a simple pulling of the plug can be activated by axially shifting the gripping casing. According to DE 10 2004 009 218 B4 a locking device is provided in a coupling connection of a fiber-optical light guide coupling cable with an endoscope lens, whereby a radially movable locking body engages in a recess on the circumference of a connection piece. A gripping casing supported in a longitudinally shiftable manner carries an inwardly projecting cam that holds the locking body in the locking position in the rest position of the gripping casing. By shifting the gripping casing in the longitudinal direction the locking body is released so that the fiber-optical light guide connection cable can be plugged in and pulled off.

SUMMARY OF THE INVENTION

The present invention solves the task of providing an easy-to-manage coupling for a detachable connection of a fiber-optical light guide to a coupling counterpart. The present invention provides a coupling device, whereby an increased security against an unintended detaching of the connection is provided.

The present invention provides a coupling and a coupling device.

A coupling in accordance with the invention for the detachable connecting of a fiber-optical light guide to a coupling counterpart comprises a coupling body that is connected to a substantially casing-shaped fiber-optical light guide frame. The fiber-optical light guide frame is designed to hold an end area of a fiber-optical light guide that can form a plane end surface that can be arranged to be in contact with or opposite a corresponding plane end surface of another fiber-optical light guide. The other fiber-optical light guide is associated with the coupling counterpart. Even the coupling body can be constructed to be casing-shaped or cylindrical, whereby a longitudinal axis of the coupling body and of the fiber-optical light guide frame is defined by the longitudinal axis of the end area of the fiber-optical light guide.

Furthermore, the coupling in accordance with the invention comprises a gripping casing that surrounds the coupling body at least in sections on the circumferential side. Since the coupling body can surround the fiber-optical light guide frame on the circumferential side, the gripping casing is constructed in particular in such a manner that the coupling body or a part of it and the fiber-optical light guide frame or a part of it are arranged inside the gripping casing. The gripping casing is designed to be grasped by an operating person and can be provided to this end, for example, on the outside with gripping grooves or flattened areas.

Furthermore, the coupling in accordance with the invention comprises at least one locking hook that is held in a resiliently movable manner in the radial direction on the coupling body. The locking hook is constructed for locking engagement behind at least one locking projection of the coupling counterpart. For this, the locking hook is arranged in the axial and the radial direction in such a manner that during the connecting of a fiber-optical light guide held in the fiber-optical light guide frame to the coupling counterpart the locking hook moves into engagement behind the locking projection. If, for example, the coupling counterpart or a part of it is pushed into the coupling body, the locking hook is arranged after the insertion in the area of the locking projection and is pre-tensioned by a spring power for engagement behind the locking projection. The locking hook is therefore held by the spring power in engagement behind the locking projection.

According to the invention the gripping casing is rotatably supported on the coupling body, whereby the at least one locking hook can be lifted out of the locking engagement behind the locking projection by a rotary movement of the gripping casing relative to the coupling body. Whereas during the using of the coupling, forces frequently act in the axial direction and as a rule are necessary for drawing the coupling and the coupling counterpart apart from one another, a rotation of the griping casing about the longitudinal axis is therefore additionally required to detach the connection. While an establishing and a detaching of the connection is possible by very simple manual manipulations, an additional security against an unintended detachment is gained in that two completely different movements are required for detaching the connection, namely, a rotary movement for detaching the locking hook and an axial movement for drawing apart the coupling and the coupling counterpart.

According to a preferred embodiment of the invention the at least one locking hook has a starting slope in the circumferential direction and the gripping casing has at least one control cam that cooperates with the starting slope for lifting out the locking hook during the rotary movement of the gripping casing. For example, a bolt can serve as control cam that is fastened on a ring connected to the gripping casing on its inside or on a ring segment or a projection and projects from the latter in the axial direction. If the bolt moves upon a rotation of the gripping casing about the longitudinal axis into engagement with the starting slope of the locking hook, which slope is directed in the circumferential direction, this hook is raised against the pre-tension of the spring and, upon further rotation of the gripping casing, finally lifted out of the locking engagement. In this manner a lifting out of the locking hook out of the locking engagement behind the locking projection can be controlled in an especially simple and reliable manner by a rotary movement of the gripping casing.

While one locking hook and a control cam are in principle sufficient for achieving the advantages of the invention, it is preferred that a plurality of locking hooks and control cams are present, in particular two locking hooks, each with a control cam. This makes possible an even more secure connection of the coupling and therewith a coupling of a fiber-optical light guide framed by the fiber-optical light guide frame to the coupling counterpart.

According to a preferred embodiment of the invention the at least one locking hook is provided on the inside with a bevel or chamfer so that the locking hook is automatically raised in the radial direction when the coupling and the coupling counterpart are moved together and is guided over the locking projection. This facilitates the establishing of a connection between the coupling and the coupling counterpart.

It is furthermore preferred that the coupling has an axial guidance of the coupling counterpart. Thus, for example, an outer side of a section of the fiber-optical light guide frame or of the coupling body can cooperate with a bore of the coupling counterpart in order to ensure a mutual guidance during the establishing of the connection by pushing together the coupling and the coupling counterpart. This makes possible a more precise alignment of the locking hooks of the coupling to the locking projections of the coupling counterpart and optionally of an end surface of the fiber-optical light guide framed in the fiber-optical light guide frame to a corresponding end surface of a fiber-optical light guide associated with the coupling counterpart. In this manner a further-improved mechanical connection as well as an improved optical connection to the transmission of light can be achieved.

According to an especially preferred embodiment of the invention the coupling body has a thread designed to cooperate with the thread of the coupling counterpart, which makes possible an additional connection of the coupling to the coupling counterpart. Thus, for example, an internal thread can be arranged on the coupling body in an area into which a cylindrical connecting piece of the coupling counterpart is inserted in order to establish the connection, which internal thread cooperates with an external thread of the cylindrical connecting piece. The connection between the coupling and the coupling counterpart is therefore established by a rotary motion with a simultaneous axial motion. Therefore, the mechanical connection is even more secure and firm and is additionally secured against a tilting of the longitudinal axis of the fiber-optical light guide relative to a longitudinal axis of another fiber-optical light guide associated with the coupling counterpart. A stop surface can also be provided against which the coupling can be firmly drawn against the coupling counterpart in order to further stabilize the connection. The at least one locking hook can be arranged in such a manner relative to the at least one locking projection that the locking engagement takes place when both threads engage into one another almost completely or to a degree sufficient for the connecting of the threads. This achieves an especially effective securing of the connection that is effective, can be readily established and operated.

In particular, the thread is advantageously designed as a 3-pitch thread. Such a thread simplifies the setting of the coupling on the coupling counterpart for establishing the connection by cooperation of the threads. It is furthermore advantageous that the thread is designed short so that the connection can be closed, for example, already by one half a rotation, which simplifies the operation. Furthermore, the thread can be constructed with a certain friction in order to further improve the reliability and the ability to operate it.

According to a preferred embodiment of the invention the rotary motion of the gripping casing relative to the coupling body is limited, in particular in both directions of rotation. Then, in order to manage the coupling and optionally an optical fiber cable provided with the latter, it can be sufficient to grasp the coupling or the cable on the gripping casing.

If the coupling is provided with a thread the rotary motion of the gripping casing relative to the coupling body is limited by a stop in particular in a closing direction of the thread. As a result, the rotary motion can be executed to connect the thread to a thread of the coupling counterpart solely by grasping the gripping casing, since when the stop is reached, the coupling body is entrained by a rotation of the gripping casing. Even a tightening of the thread for an even firmer connection of coupling and coupling counterpart is possible in this manner.

The rotary motion of the gripping casing relative to the coupling body is also limited in an advantageous manner in the opening direction of the thread, in particular by a stop that can also be formed, for example, by the cooperation of the at least one control cam with the at least one starting slope. This achieves the special advantage that a detachment of the connection takes place by a rotation of the gripping casing in the direction of opening until the lifting out of the at least one locking hook from the locking engagement and by a rotation of the gripping casing in the same direction for detaching the thread engagement. Thus, for example, a movement range of approximately 10° between the gripping casing and the coupling body can be provided that can be sufficient for a lifting of the locking hook. The threads can then be detached from one another by a further rotation in the same direction by, for example, approximately 180°. Therefore, the detachment of the locking connection as well as of the screw connection can take place by a continuous rotary motion. This makes possible an especially simple handling. An additional axial motion can be required for the complete detachment of the coupling or the fiber-optical light guide and the coupling counterpart.

The coupling body is rotatably connected in a preferred manner to the fiber-optical light guide frame, which brings about an especially simple handling and additional reliability against an unintended detachment. However, the coupling body can also be permanently connected to the fiber-optical light guide frame or constructed in one piece with it. Furthermore, the at least one locking hook can be constructed as an axial projection of the coupling body.

A coupling device in accordance with the invention comprises a coupling as previously described and a coupling counterpart, whereby the coupling counterpart comprises at least one locking projection for a locking engagement of the at least one locking hook.

The locking projection can be formed by an elevation on an outer side of the coupling counterpart as well as by an appropriate recess. According to a preferred embodiment of the coupling device the locking projection is formed by a circumferential flange of a coupling connection piece of the coupling counterpart which connecting piece can be introduced into the coupling, in particular into the coupling body of the coupling. Such a circumferential flange can also be formed by the edge of a circumferential groove. The at least one locking hook is preferably designed to overcome the flange upon an axial movement during the connecting of the coupling device. In particular, the coupling connecting piece is constructed cylindrically. This makes an especially simple manufacture of the coupling device possible. Furthermore, a circumferential flange makes possible a locking engagement independently of a position of the rotation of the coupling relative to the coupling counterpart. The locking projection can be sufficiently steep or even be constructed with an undercut so that a force acting in the axial direction cannot result in a detachment of the connection.

The coupling is constructed in a preferred manner as part of an optical fiber cable and the coupling counterpart as a light connection of an endoscope. The endoscope can be constructed, depending on the intended usage, to be rigid, semi-rigid or flexible. The light connection and the optical fiber cable can comprise other optical or mechanical elements. The coupling device in accordance with the invention and an optical fiber cable provided with the coupling in accordance with the invention make possible an especially secure connection of the optical fiber cable to the endoscope, which connection can nevertheless be established and detached by simple manual manipulations. In particular, an unintended detachment can be avoided in an especially reliable manner.

It is understood that the previously cited features and those still to be explained in the following can be used not only in the particular indicated combination but also in other combinations or by themselves without departing from the framework of the present invention.

Other aspects of the invention result from the following description of a preferred exemplary embodiment and from the attached drawings. For the sake of clarity, all reference numerals are not shown in all figures.

DETAILED DESCRIPTION OF THE INVENTION

Figure 1A:
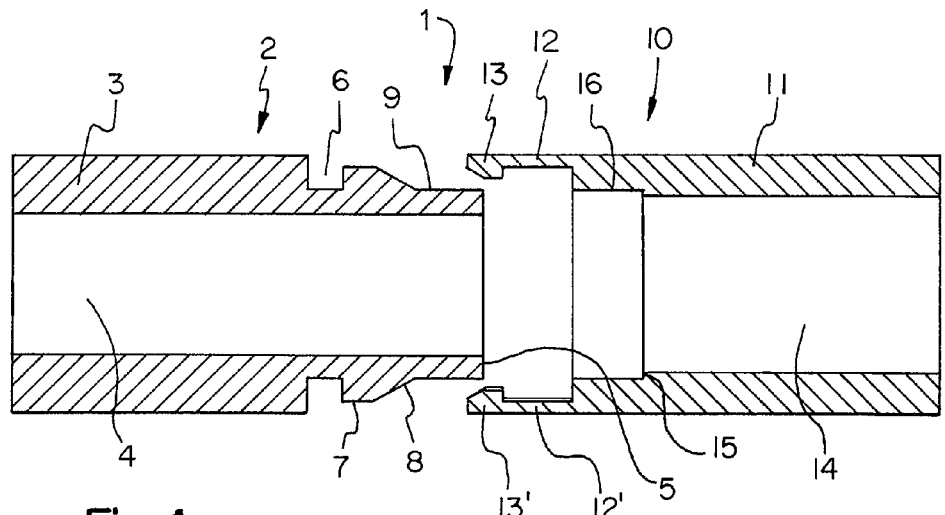
FIGS. 1a to 1c show a first exemplary embodiment of a coupling device in accordance with the invention in a simplified view in longitudinal section and transverse section.

According to the exemplary embodiment shown in FIG. 1a in a simplified view a coupling device 1 in accordance with the invention comprises a light connection 2 of an endoscope (not shown) and comprises a coupling 10. The light connection 2 is constructed as a substantially cylindrical connecting piece 3 for a light connection in the inner chamber 4 of which an illuminating fiber-optical light guide (not shown) of the endoscope is arranged that can have a plane end surface that is flush, for example, with an end-side surface 5 of the connecting piece 3 for the light connection. A circumferential groove 6 is formed in the end area of the connecting piece 3 for the light connection which groove is closed by a circumferential flange 7. The flange 7 has on the side of groove 6 a steep wall standing vertically, for example, to a longitudinal axis of the connecting piece 3 for the light connection whereas the flange 7 merges on an end side into a slope 8. Further on the end side the connecting piece 3 for the light connection carries a three-pitch outer thread 9.

The coupling 10 comprises a coupling body 11 that is constructed as a substantially cylindrical casing and merges in the axial direction into two resilient tongues 12, 12' that each carry a locking hook 13, 13'. A fiber-optical light guide frame (not shown) is received in the interior space 14 of the coupling body 11 in which frame an end area of the fiber-optical light guide of an optical fiber cable is held. The fiber-optical light guide can have a plane end surface that is closed, for example by the offset 15. In the end area the coupling body 11 carries a three-pitch inner thread 16.

Figure 1B:
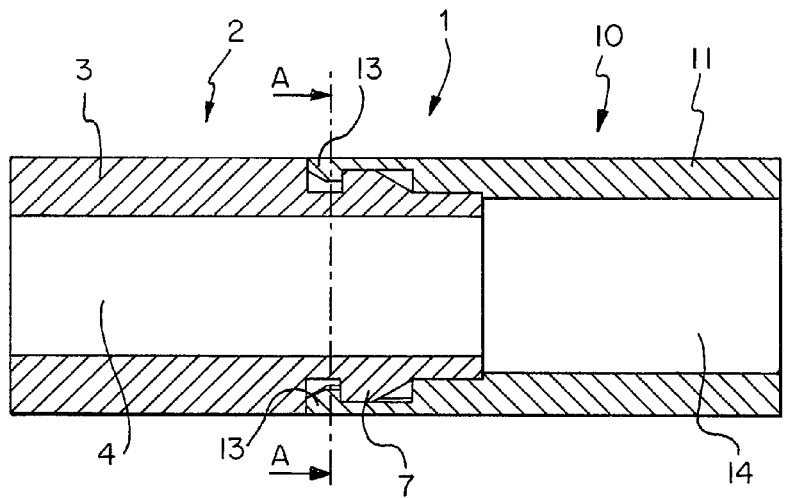

The coupling 10 and the light connection 2 serving as coupling counterpart are shown in FIG. 1a in a non-connected state. The coupling 10 can be approached to the light connection 2 by axial shifting. A mechanical connection between the coupling body 11 and the connecting piece 3 of the light connection is established by a further axial shifting during a rotational motion, i.e., by a screwing motion by screwing the inner thread 16 with the outer thread 9. During this time the locking hooks 13, 13', that can be beveled on their side abutting against the flange 7, overcome the flange 7 via the slope 8. As a result of the spring power of the resilient tongues 12, 12' the locking hooks 13, 13' engage behind the flange 7, securing in this manner the mechanical connection of the coupling 10 to the light connection 2. This situation is shown in FIG. 1b. The plane end surfaces of the fiber-optical light guides lie in this instance against one another or almost against one another.

Figure 1C:
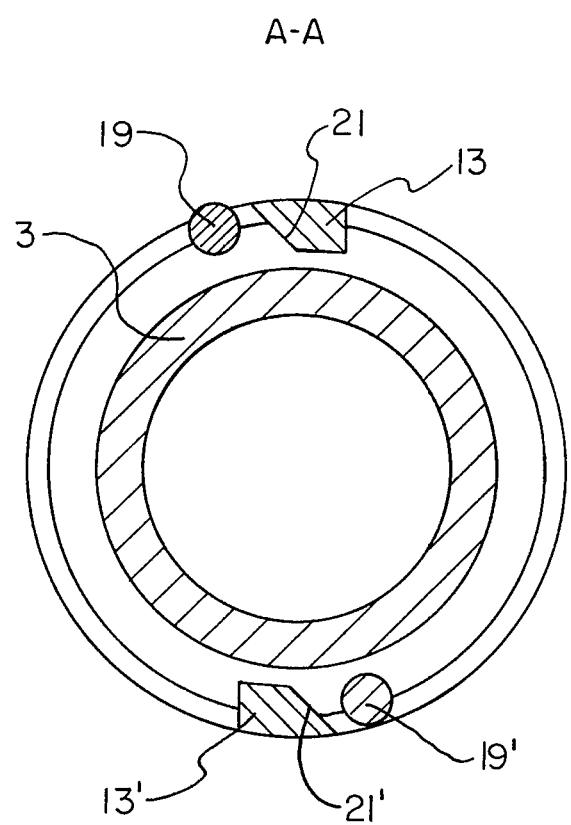

The coupling body 11 is surrounded on the outside by a gripping casing that is not shown in FIGS. 1a to 1c. As is symbolically shown as a cross-sectional view in the plane A-A indicated in FIG. 1b, two axially directed bolts 19, 19' are attached on the inside of the gripping casing that grip under the starting slopes 21, 21' of the locking hooks 13, 13' upon a rotation of the gripping casing and lift them radially outward. If the locking hooks 13, 13' have been raised out of the locking engagement the coupling 10 can be detached from the light connection 2 by a screwing motion that is counter to the one executed for the connection. The starting slopes 21, 21' serving as control surfaces can be constructed in particular as inclined planes. The locking hooks 13, 13' and the groove 6 and the flange 7 are arranged, for example, in such a manner relative to each other that the locking hooks 13, 13' move behind flange 7 into a locking engagement when the outer thread 9 and the inner thread 16 are almost completely or also only partially engaged with one another.

Figure 2:
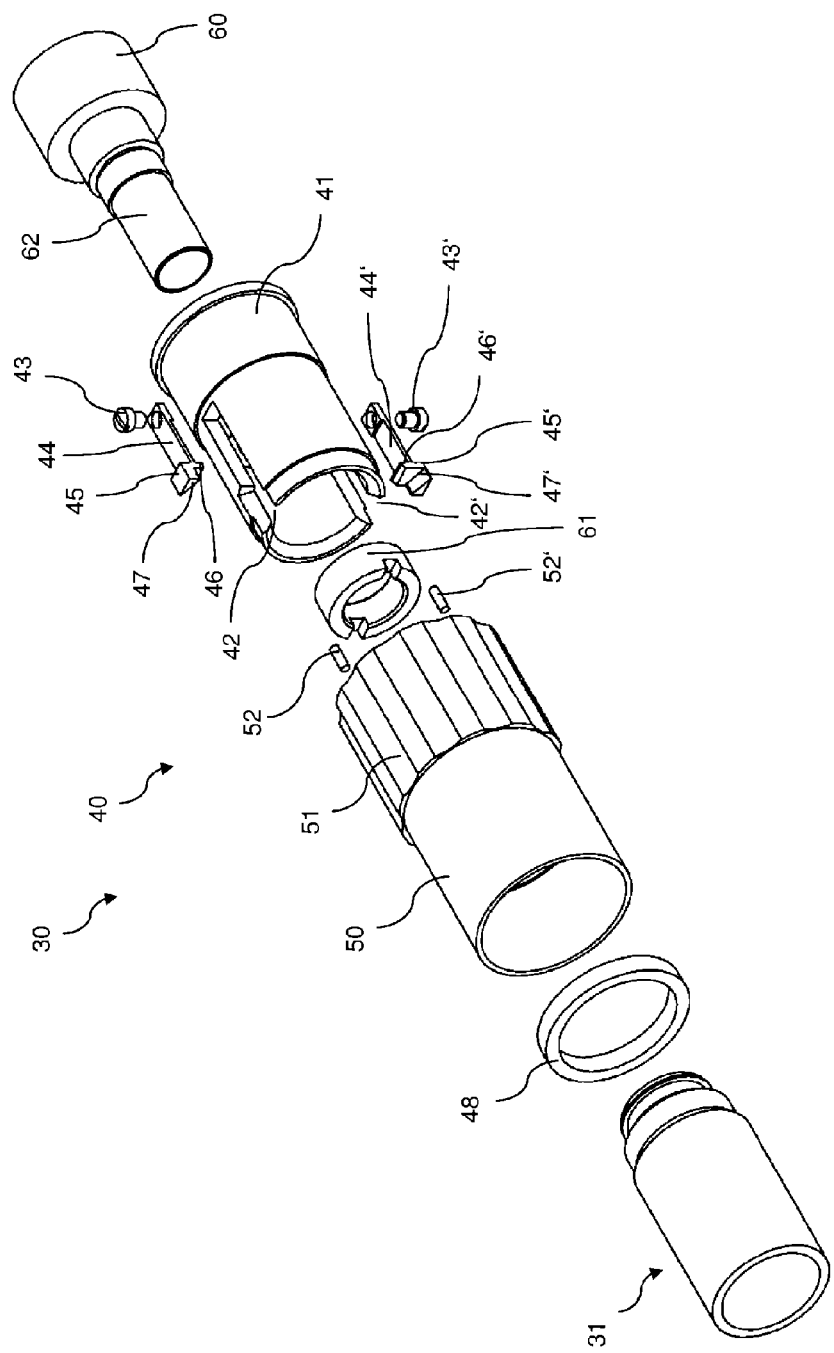
FIG. 2 shows a second exemplary embodiment of a coupling device in accordance with the invention in a perspective view as an exploded drawing.

According to FIG. 2 another exemplary embodiment of a coupling device 30 in accordance with the invention comprises a light connection 31 of an endoscope (not shown) that serves as a coupling counterpart, and comprises a coupling 40 of an optical fiber cable. The coupling 40 comprises a coupling body 41 that is constructed like a casing and is provided on its end 42, 42' directed toward the light connection 31 with two slots. Two resilient tongues 44, 44' are fastened on the coupling body 41 in the slots 42, 42' with screws 43, 43', each of which tongues carries a locking hook 45, 45'. Each locking hook 45, 45' has a locking extension 46, 46' in the radial direction and has a starting slope 47, 47' in the circumferential direction. The coupling 40 furthermore comprises a gripping casing 50 that is set on the outside of the coupling body 41. The gripping casing 50 has gripping grooves 51 on its outside. Axially directed bolts 52, 52' are held inside the gripping casing. A screw ring 48 is screwed onto the coupling body for the rotatable holding of the gripping casing 50.

A fiber-optical light guide frame 60 is set into the coupling body 41 which frame is rotatably held in the coupling body 41 by the slotted nut 61. The fiber-optical light guide frame 60 serves to frame a fiber-optical light guide (not shown) that is guided to the light-connection-side end of the fiber-optical light guide frame 60 in a cylindrical or even conical extension 62 of the fiber-optical light guide frame, where it forms a plane end surface. Optical fibers or a fiber-optical light guide can be guided inside the light connection 31 and form a plane end surface inside the light connection 31. The fiber-optical light guides can be adhered in particular in the fiber-optical light guide frame 60 or in the light connection 31. The fiber-optical light guide frame 60 can merge on the side opposite the light connection 31 into a bend protection of an optical fiber cable inside which the fiber-optical light guide runs; even a jacket or a cable hose of the optical fiber cable can be held in the fiber-optical light guide frame 60 (not shown).

Figure 3A:
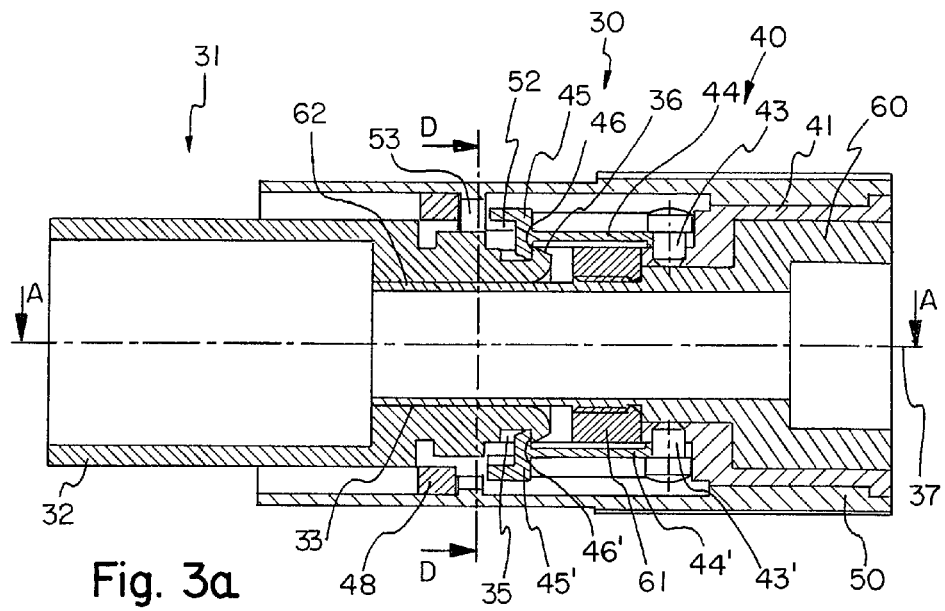
FIGS. 3a and 3b show the coupling device of FIG. 2 in longitudinal section in two longitudinal planes rotated toward one another through 90°.
Figure 3B:
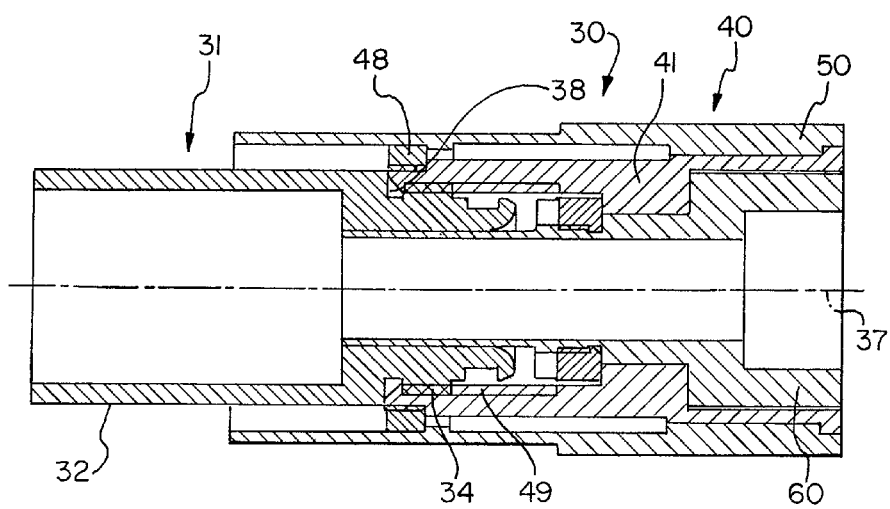

FIG. 3a shows a longitudinal section through the coupling device 30 shown in FIG. 2 in the connected state in a plane running through the slots 42, 42' of the coupling body 41; FIG. 3b shows a longitudinal section in a plane A-A vertical to it, as is indicated in FIG. 3a.

As is shown in FIGS. 3a and 3b, the light connection 31 comprises a casing-shaped connecting piece 32 for a light connection which piece 32 forms a cylindrical bore 33 on the inside of its end on the coupling side, which bore serves during the connecting of the coupling device 30 to receive and guide a cylindrical extension 62 of the fiber-optical light guide frame 60. In order to facilitate the introduction of the extension 62 into the bore 33 the bore can be constructed with play opposite the extension 62; furthermore, the coupling-side end of the bore 33 can be widened and/or the end of the connecting piece 32 for a light connection can be rounded. The connecting piece 32 for a light connection has an outer thread 34 that is indicated in FIG. 3b and has, for example, three pitches. Furthermore, the connecting piece 32 for a light connection has a circumferential groove 35 and a circumferential flange 36.

According to FIG. 3a the coupling body 41 carries two resilient tongues 44, 44', that are firmly connected to the coupling body with the aid of screws 43, 43'. The resilient tongues 44, 44' each end in a locking hook 45, 45' that comprises a radially inwardly projecting catch extension 46, 46'; furthermore, the locking hooks 45, 45' have starting slopes in the circumferential direction. The catch extensions 46, 46' are beveled on one side on the inside in the axial direction. The flange 36 is also beveled on one side in the axial direction, whereby the bevelings of the flange 36 and of the locking extensions 46, 46' cooperate during the connecting of the coupling 40 with the light connection 31 in order to raise the locking extensions 46, 46' over the flange 36 against the spring power of the resilient tongues 44, 44'.

As FIG. 3b shows, the coupling body 41 has an inner thread 49 interrupted by the slots 42, 42' (cf. FIG. 2) that can be screwed onto the outer thread 34 of the connecting piece 32 for a light connection for connecting the coupling 40 to the light connection 31. The coupling body 41 can be drawn tightly against a stop surface 38 of the connecting piece 32 for a light connection. The inner thread 49 can also be constructed shorter than is shown in FIG. 3b. In the connected state the locking extensions 46, 46' of the locking hooks 45, 45' reach behind the flange 36 of the connecting piece 32 for a light connection and therefore additionally secure the connection of the threads 34, 49 against an unintended detachment.

The gripping casing 50 is set on the outside onto the coupling body 41 and is rotatably held on the coupling body 41 by the screw ring 48. Axially directed bolts 52, 52' are held on inwardly projecting extensions 53, 53' of the gripping casing 50. The extensions 53, 53' grip into the slots 42, 42' (see FIG. 2) and thus limit the rotary movement of the gripping casing 50 relative to the coupling body 41, for example, to a range of approximately 10°.

The fiber-optical light guide frame 60 is rotatably held inside the coupling body 41 by the slotted nut 61. As already explained for FIG. 2 the fiber-optical light guide frame 60 is constructed in a casing shape and serves to frame the fiber-optical light guide as well as, optionally, a jacket of the optical fiber cable and can merge, for example, into a bend protection that sectionally surrounds the optical fiber cable (not shown). The longitudinal axis of the fiber-optical light guide as well as of the fiber-optical light guide frame 60 and of the connecting piece 32 for a light connection is designated in FIGS. 3a and 3b by the reference numeral 37.

Figure 4:
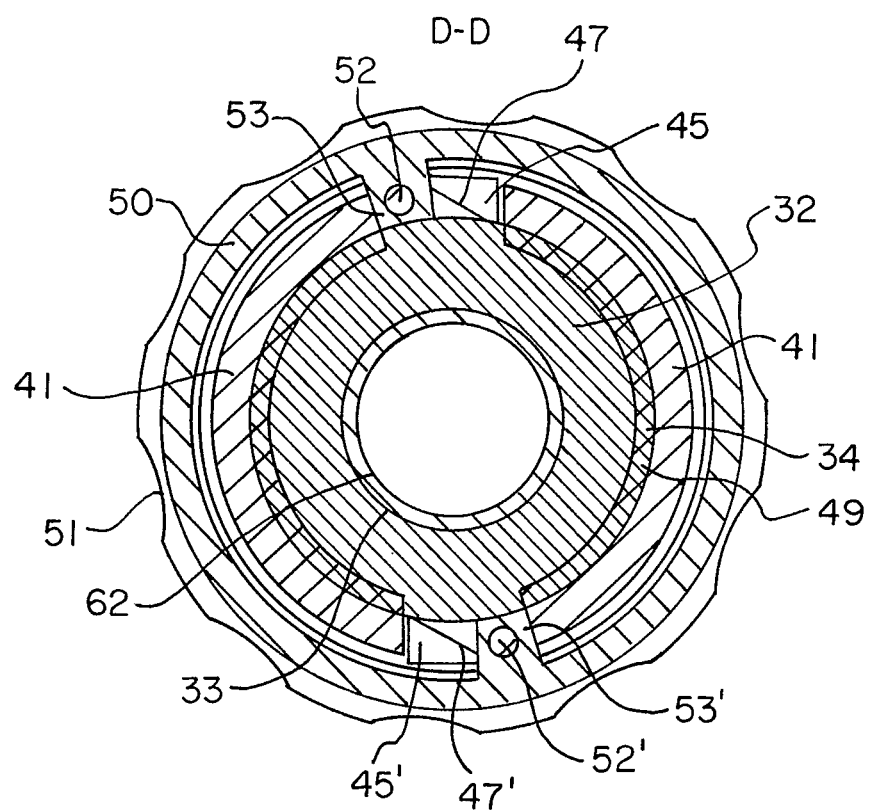
FIG. 4 shows the coupling device of FIG. 2 in cross section.

FIG. 4 shows a cross section in the plane D-D indicated in FIG. 3a. The gripping casing 50, that is provided on the outside with gripping grooves 51, carries axially directed bolts 52, 52' on the inside on extensions 53, 53', which bolts are arranged in such a manner that they grip under starting slopes 47, 47' of the locking hooks 45, 45' upon a rotation of the gripping casing 50 relative to the coupling body 41 and as a result move these hooks outward. It can furthermore be recognized from FIG. 4 that the coupling body carries an inner thread 34 that is in engagement with an outer thread 49 of the connecting piece 32 for a light connection. The extension 62 of the fiber-optical light guide frame 60 is arranged inside the bore 33.

Figure 5:
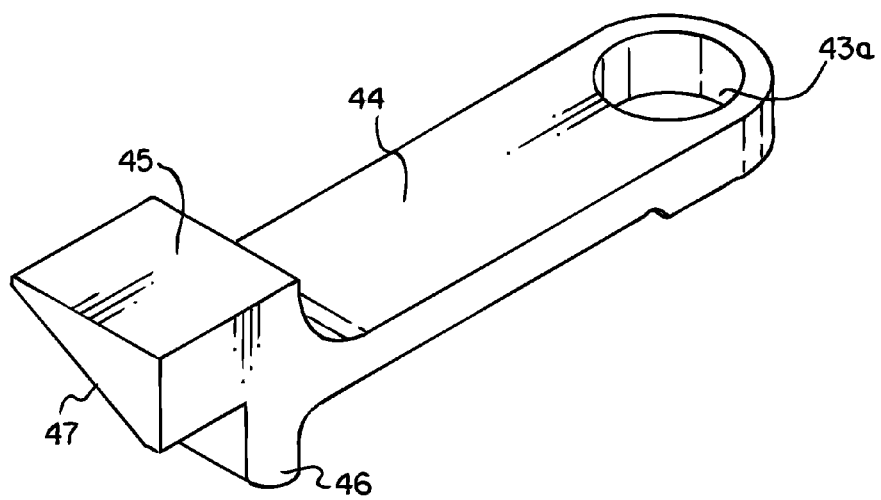
FIG. 5 shows a locking hook in an enlarged perspective view.

FIG. 5 shows a locking hook 45 carried by a resilient tongue 44 on an enlarged scale. The resilient tongue 44 can be fastened on the coupling body 41 by a screw 43 inserted in the bore 43a (see FIGS. 2, 3a). The locking hook 45 comprises a locking extension 46 for locking engagement behind a locking projection and comprises a starting slope 47 for raising the locking extension 46 out of the locking engagement. The locking extension 46 is chamfered on its front side for lifting during connection on the inside but is constructed to be steep on its rear side for holding the locking engagement.

Figure 6:
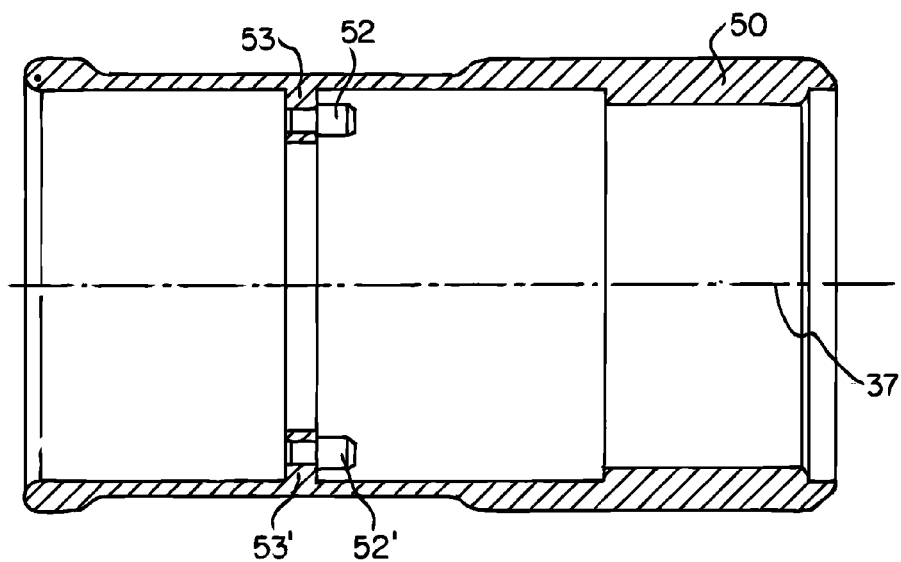
FIG. 6 shows an exemplary embodiment of a gripping casing in longitudinal section.

FIG. 6 shows the arrangement of the bolts 52, 52' on the gripping casing 50 that serve as control cams for lifting the locking hooks out of the locking engagement. The inwardly projecting extensions 53, 53' of the gripping casing 50 have bores into which the bolts 52, 52' are inserted in the axial direction. The bolts 52, 52' can be hardened, as well as the springs 44, 44' and the locking hooks 45, 45' while the other elements of the coupling 40 can consist, for example, of non-hardened steel.

In order to connect the coupling 40 shown in FIGS. 2 to 6 to the light connection 31 the coupling 40 and the light connection 31 are guided onto one another in the axial direction until the gripping casing 50 surrounds the connecting piece 32 for a light connection and the extension 62 of the fiber-optical light guide frame 60 is guided through the bore 33 of the connecting piece 32 for a light connection. The threads 34, 49 are brought in engagement with one another by a further guiding in under execution of a screwing motion and are tightened, for example, by a one-half revolution. At this time the locking hooks 45, 45' slide over the chamfered, circumferential flange 36 serving as locking projection and move into a locking engagement with the groove 35 for securing the screw connection, whereby the locking engagement can take place after a complete or also already after a partial connecting of the threads 34, 49, for example, already after a rotation through 90°. The rotary motion can be carried out solely by activating the gripping casing 50 since it is transferred onto the coupling body 41 via the inside extensions 53 that engage in the slots 42, 42'. The end surfaces of the fiber-optical light guides held in the fiber-optical light guide frame 60 and in the connecting piece 32 for a light connection 32 are brought in contact with each other or into an opposing position by the mechanical connection of the coupling 40 with the light connection 31, whereby an air gap of approximately 0.2 to 0.5 mm can remain.

In order to detach the coupling the gripping casing 50 is rotated about the longitudinal axis 37 in the opening direction of the threads 34, 49, during which the bolts 52, 52' lift the locking hooks 45, 45' out of the locking engagement behind the flange 36 acting as a locking projection after a short rotational path via the starting slopes 47, 47'. The rotary motion of the gripping casing 50 relative to the coupling body 41 is limited to a range of approximately 10° by the movement of the extensions 53 inside the slots 42, 42' or by the lifting-out movement of the locking hooks 45, 45'. When the limit of the rotary motion of the gripping casing 50 relative to the coupling body 41 is reached, the torque is transferred from the gripping casing 50 onto the coupling body 41 and the screw connection of the threads 34, 49 is detached, for example, by a one-half rotation. Thereafter the coupling 40 and the light connection 31 can be pulled apart from one another in the axial direction.

Therefore, in order to connect and to detach the connection an actuation of the gripping casing 50 in one direction in each instance is sufficient. The coupling body 41 or the optical fiber cable do not have to be grasped for this. In particular, the gripping casing 50 can practically completely surround the coupling body 41. This makes an especially simple handling possible.

What is claimed is:

1. A coupling for a detachable connection of a fiber-optical light guide to a coupling counterpart, the coupling comprising:
   a coupling body that is connected to a fiber-optical light guide frame with a gripping casing that circumferentially surrounds the coupling body at least in sections, and
   at least one locking hook that is movably held in a radially resilient manner for a locking engagement behind at least one locking projection of the coupling counterpart, the at least one locking hook being pre-tensioned and held in a locking position in response to an elastic force of a resilient tongue that carries the at least one locking hook and extends from the coupling body, wherein the gripping casing is rotatably supported on the coupling body and that the at least one locking hook is lifted out of the locking engagement by a rotary movement of the gripping casing,
   wherein the at least one locking hook has a starting slope in a circumferential direction, and the gripping casing has at least one control cam that cooperates with the starting slope to lift the at least one locking hook radially outward from the locking engagement with the at least one locking projection during rotary movement of the gripping casing,
   wherein the resilient tongue has a bore through which a fastener is inserted to attach the resilient tongue to the coupling body.

2. The coupling of 1, wherein a plurality of locking hooks and control cams is present.

3. The coupling of claim 1, wherein the at least one locking hook is chamfered on the inside for lifting the locking hook when the coupling body and the coupling counterpart are brought together.

4. The coupling of claim 1, wherein an outer side of a section of the fiber-optical light guide frame or of the coupling body cooperates with a bore of the coupling counterpart to provide axial guidance of the coupling counterpart.

5. The coupling of claim 1, wherein the coupling body is rotatably connected to the fiber-optical light guide frame.

6. A coupling device comprising:
   a coupling of claim 1 and
   the coupling counterpart, wherein the coupling counterpart has at least one locking projection for a locking engagement of the at least one locking hook of the coupling.

7. The coupling of claim 6, wherein the locking projection is formed by a circumferential flange of a coupling connecting piece that can be introduced into the coupling.

8. The coupling device of claim 6, wherein the coupling is constructed as part of an optical fiber cable and wherein the coupling counterpart is constructed as a light connection of an endoscope.

9. The coupling of claim 2, wherein two locking hooks and two control cams are provided.

10. The coupling of claim 1, wherein the coupling body has a thread for connection to a thread of the coupling counterpart.

11. The coupling of claim 1, wherein the rotary movement of the gripping casing relative to the coupling body is limited.

12. The coupling of claim 1, wherein the at least one control cam is at least one bolt attached to the gripping casing, the at least one bolt is disposed parallel to a longitudinal axis of the gripping casing, and the at least one bolt is configured to grip under the starting slope of the at least one locking hook and lift the at least one locking hook radially outward upon rotation of the gripping casing.

13. The coupling of claim 1, wherein the starting slope of the at least one locking hook comprises an inclined plane.

14. The coupling of claim 1, wherein the at least one control cam is attached to an extension of the gripping casing, the extension being disposed radially inward from an interior surface of the gripping casing.

15. The coupling of claim 1, wherein the locking hook has a back side relative to an axial direction of a connecting movement, the back side being perpendicular to a longitudinal axis of the coupling body and adapted to engage with a side of the locking projection which is perpendicular to a longitudinal axis of the coupling counterpart to provide a firm connection between the coupling and the coupling counterpart.

16. The coupling of claim 1, wherein the resilient tongue that carries the locking hook is releasably attached to the coupling body.

17. A coupling for a detachable connection of a fiber-optical light guide to a coupling counterpart, the coupling comprising:
   a coupling body that is connected to a fiber-optical light guide frame with a gripping casing that circumferentially surrounds the coupling body at least in sections, and
   at least one locking hook that is movably held in a radially resilient manner for a locking engagement behind at least one locking projection of the coupling counterpart, the at least one locking hook being pre-tensioned and held in a locking position in response to an elastic force of a resilient tongue that carries the locking hook and extends from the coupling body, wherein the gripping casing is rotatably supported on the coupling body and that the at least one locking hook is lifted out of the locking engagement by a rotary movement of the gripping casing,
   wherein the locking hook has a back side relative to an axial direction of a connecting movement, the back side being perpendicular to a longitudinal axis of the coupling body and adapted to engage with a side of the locking projection which is perpendicular to a longitudinal axis of the coupling counterpart to provide a firm connection between the coupling and the coupling counterpart,
   wherein the resilient tongue has a bore through which a fastener is inserted to attach the resilient tongue to the coupling body.

18. A coupling for a detachable connection of a fiber-optical light guide to a coupling counterpart, the coupling comprising:
   a coupling body that is connected to a fiber-optical light guide frame with a gripping casing that circumferentially surrounds the coupling body at least in sections, and
   at least one locking hook that is movably held in a radially resilient manner for a locking engagement behind at least one locking projection of the coupling counterpart, the at least one locking hook pre-tensioned by its elastic force to be held in the locking engagement, wherein the gripping casing is rotatably supported on the coupling body and that the at least one locking hook is lifted out of the locking engagement by a rotary movement of the gripping casing,
   wherein the at least one locking hook has a back side relative to an axial direction of a connecting movement, the back side being perpendicular to a longitudinal axis of the coupling body and adapted to engage with a side of the locking projection which is perpendicular to a longitudinal axis of the coupling counterpart to provide a firm connection between the coupling and the coupling counterpart,
   wherein the at least one locking hook has a body with a bore through which a fastener is inserted to attach the at least one locking hook to the coupling body.

\* \* \* \* \*